March 6, 1956 G. E. WHITE ET AL 2,737,652
FIXED GUN INTER-AIRCRAFT FIRE CONTROL SYSTEM
Filed Feb. 18, 1943 4 Sheets-Sheet 1

FIG. 1A.

INVENTORS
GIFFORD E. WHITE
JAMES E. SHEPHERD
BY
Herbert H. Thompson
THEIR ATTORNEY

FIG. 3.
SEARCH

FIG. 4.
TRACK

United States Patent Office 2,737,652
Patented Mar. 6, 1956

2,737,652
FIXED GUN INTER-AIRCRAFT FIRE CONTROL SYSTEM

Gifford E. White and James E. Shepherd, Hempstead, N. Y., assignors to Sperry Rand Corporation, a corporation of Delaware Application February 18, 1943, Serial No. 476,354

7 Claims. (Cl. 343—7.3)

The present invention is concerned with inter-aircraft fire control apparatus especially adapted for use on fighter or interceptor aircraft which carry fixed guns, that is, guns whose line of fire is always fixed and parallel with respect to the craft axis.

Presently used inter-aircraft fire control systems for such fixed gun aircraft are very elementary, comprising merely an optical sight whose axis is normally parallel with respect to the gun and craft axis. A rough correction for superelevation is obtained by slightly offsetting the sight axis with respect to the gun axis in elevation, the amount of offset being manually varied in steps according to the range.

In presently used systems, since no computation of lead angle is made, it is not sufficient that the target be visible to the pilot in his sight; it is also necessary that the lead angle, if one were computed, be substantially negligible. It is apparent that this condition obtains only when the pilot is on the target's tail, that is, the line of sight is substantially parallel to the direction in which the target is moving. To meet this condition a large period of time, amounting to several minutes, is generally consumed after the target has first been sighted.

This same system, described above, is adapted to night flying by the provision of suitable radio locating and position finding apparatus, which replaces the optical sight and performs essentially the same function. It is adapted to locate a target and provide indications on a cathode ray tube indicator screen of the target's azimuth, elevation, and slant range with respect to the plane. The pilot may then fly the plane until zero azimuth and elevation are indicated. If, at this time, the zero indications of azimuth and elevation may be maintained while flying his own plane at constant attitude (the target is then flying at constant attitude and his own craft is on its tail), he may fire and expect a hit. Thus, the previously known system is even more difficult to use at night.

By the present invention it is proposed to overcome these disadvantages by providing a suitable computing system so that the proper lead angle for accurate fire may be automatically obtained, thus overcoming the necessity of the pilot meeting the conditions that the lead angle be negligible, and allowing him to fire quickly after sighting the target, and at a distance limited only by the range of his guns.

Inter-aircraft computers for flexibly or rotatably mounted guns are available, which are adapted to have set into them data corresponding to indicated air speed (I. A. S.) of the craft, altitude (H) of the craft, the present position of the target relative to the craft in terms of its elevation ($E_0$), azimuth ($A_0$), and slant range ($D_0$) coordinates, and the rates of change of the present orientation of the target in terms of elevation and azimuth ($E_r$, $A_r$), and to produce from these data gun elevation ($E_g$) and gun azimuth ($A_g$) data which indicate the correct gun aiming angles at which the guns must be positioned with respect to the craft to effectively fire at the target. Such a computer is described in copending application Serial No. 411,186 for Inter-Aircraft Gun Sight and Computer, filed September 17, 1941, in the names of C. G. Holschuh and D. Fram, and now abandoned. Such computers have heretofore been used only on aircraft whose guns are orientable with respect to the ship in elevation and azimuth.

Obviously, on fixed gun aircraft, it becomes impossible to orient the guns with respect to the craft in accordance with the computed gun elevation ($E_g$) and gun azimuth ($A_g$) angles, since, the guns are fixed on the craft parallel to the craft axis, so that these angles are fixed at zero. In the present invention it is proposed to compute these gun angles, and then fly the craft in such a manner as to reduce them to zero. When these computed gun angles are zero, the craft and guns are properly oriented to effect a hit. Since, in the case of fixed gun aircraft the actual gun elevation ($E_g$) and gun azimuth ($A_g$) angles must always be zero, it is better to consider the corresponding computed angles as elevation error ($E_{error}$) and azimuth error ($A_{error}$) angles, and as representing the angular displacement between the actual orientation of the craft and the computed orientation necessary to effect a hit.

In the present invention simplified electro-mechanical computing apparatus is disclosed which is better adapted to be used on fighter and interceptor aircraft than is the more complicated computer described in the above-mentioned copending application Serial No. 411,186. There is also disclosed a radio object detecting and position finding system which is adapted during the first, or "search," mode of operation to provide an indication of the range and orientation of possible targets within a predetermined portion of space, and during the second, or "track," mode of operation to supply the required present position input data to the computing apparatus. The angular rates for the computing mechanism are obtained from a pair of angular rate gyros. The invention also comprises an automatic pilot system, whereby the plane may be automatically flown in such a manner as to reduce the computed elevation and azimuth error angles to zero.

Accordingly, the principal object of the present invention is to provide an automatic inter-aircraft fire control system adapted for use on aircraft carrying fixed guns.

Another object of the invention is to provide a completely automatic fire control and servo system adapted to fly an aircraft carrying fixed guns in accordance with computed signals in such a manner that the craft (and the guns) will be correctly oriented for effective gun fire.

Still another object of the invention is to provide a simple electro-mechanical computing system especially adapted for use on fighter or interceptor aircraft.

An object of the invention is to provide in a radio object detecting and position finding system a novel mode of "search" operation in which a predetermined portion of space is periodically searched in range.

Other objects and advantages will become apparent from the specification, taken in connection with the accompanying drawings wherein the invention is embodied in concrete form.

In the drawings.

Similar characters of reference are used in all of the above figures to indicate corresponding parts. Arrows are used to indicate the direction of flow of information.

As previously mentioned, the radio sighting system of the present invention is adapted to two successive modes of operation: 1 search operation, and 2 track operation, as determined by the position of switches 32 and 67. The operation of the circuit during search will first be described.

Figure 1A:
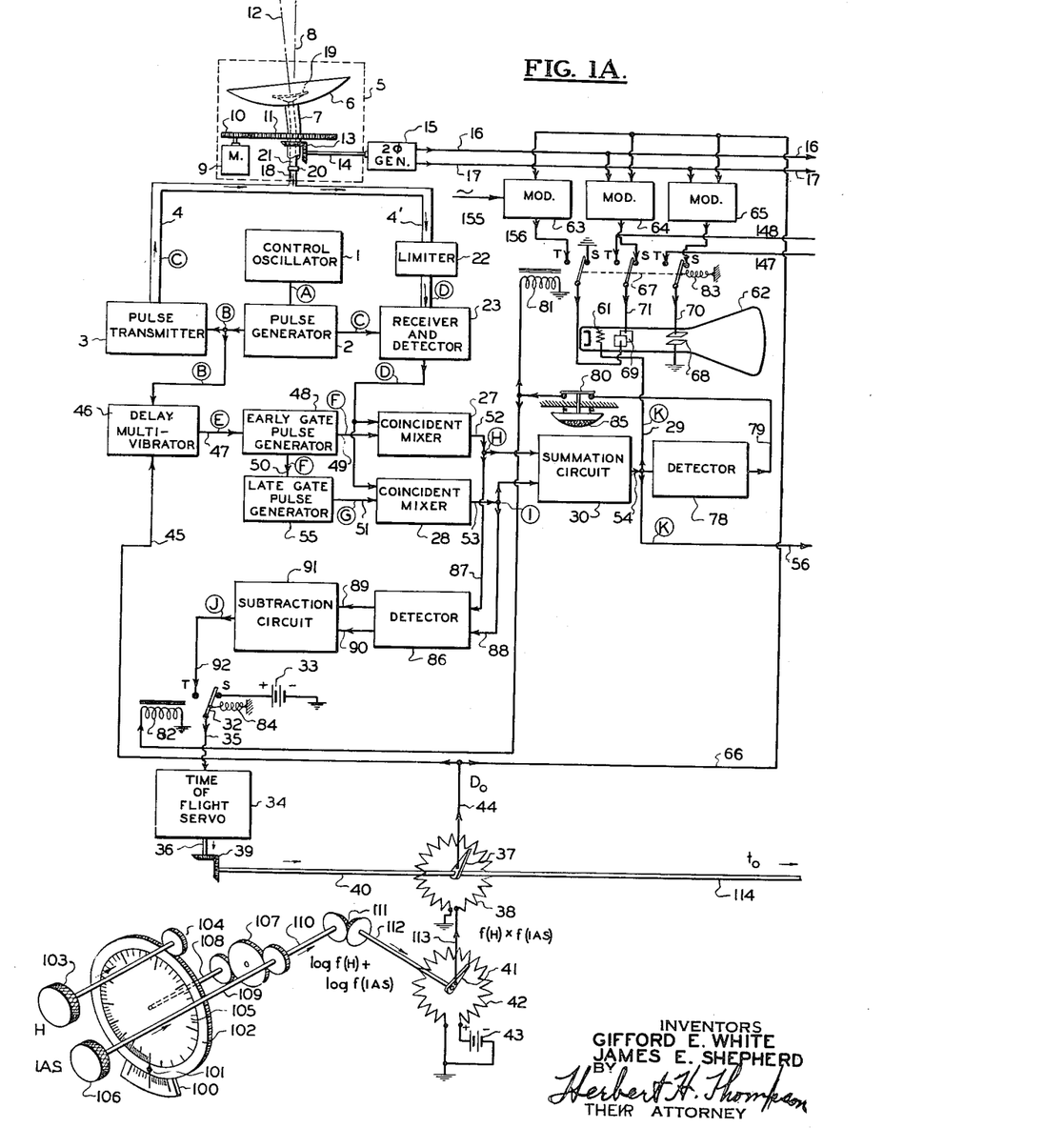
Figs. 1A and 1B, taken jointly, constitute a schematic representation of the preferred embodiment of the present invention.
Figure 1B:
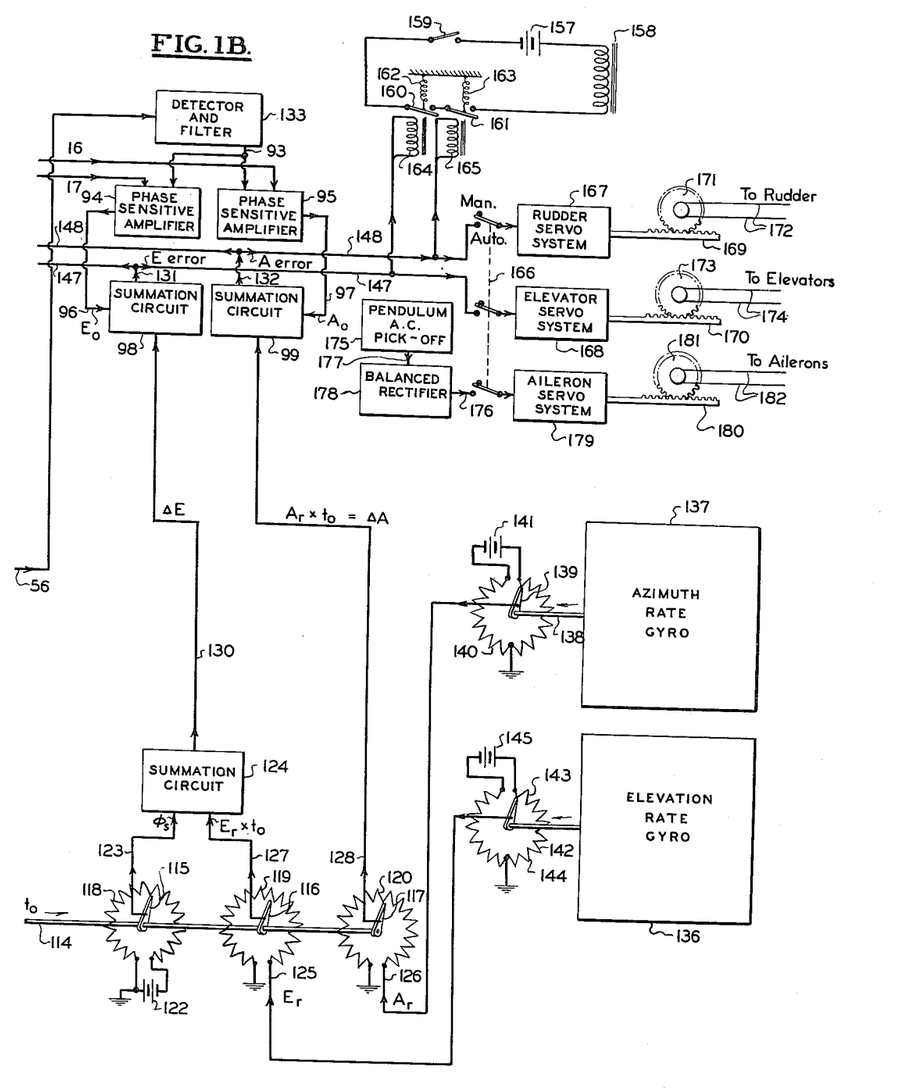

Referring to Figs. 1A and 1B, there is shown a reflected-pulse type of ultra high frequency sighting system similar to the type employed for tracking purposes in copending application Serial No. 441,188, entitled Radio Gun Control System, filed April 30, 1942, in the names of C. G. Holschuh et al., and now U. S. Patent No. 2,617,982 issued November 11, 1952. As described in that application, a control oscillator 1 provides a voltage of suitable synchronizing and control frequency of the wave shape shown in Fig. 6, curve A. The output of control oscillator 1 is fed to a pulse generator 2 which converts the sinusoidal oscillations received from the control oscillator into pulses of any desired shape, magnitude and duration, having a repetition rate equal to the frequency of oscillator 1. Pulse generator 2 employs well-known clipping, differentiating, and other suitable wave-shaping circuits in the conventional manner.

Figure 6:
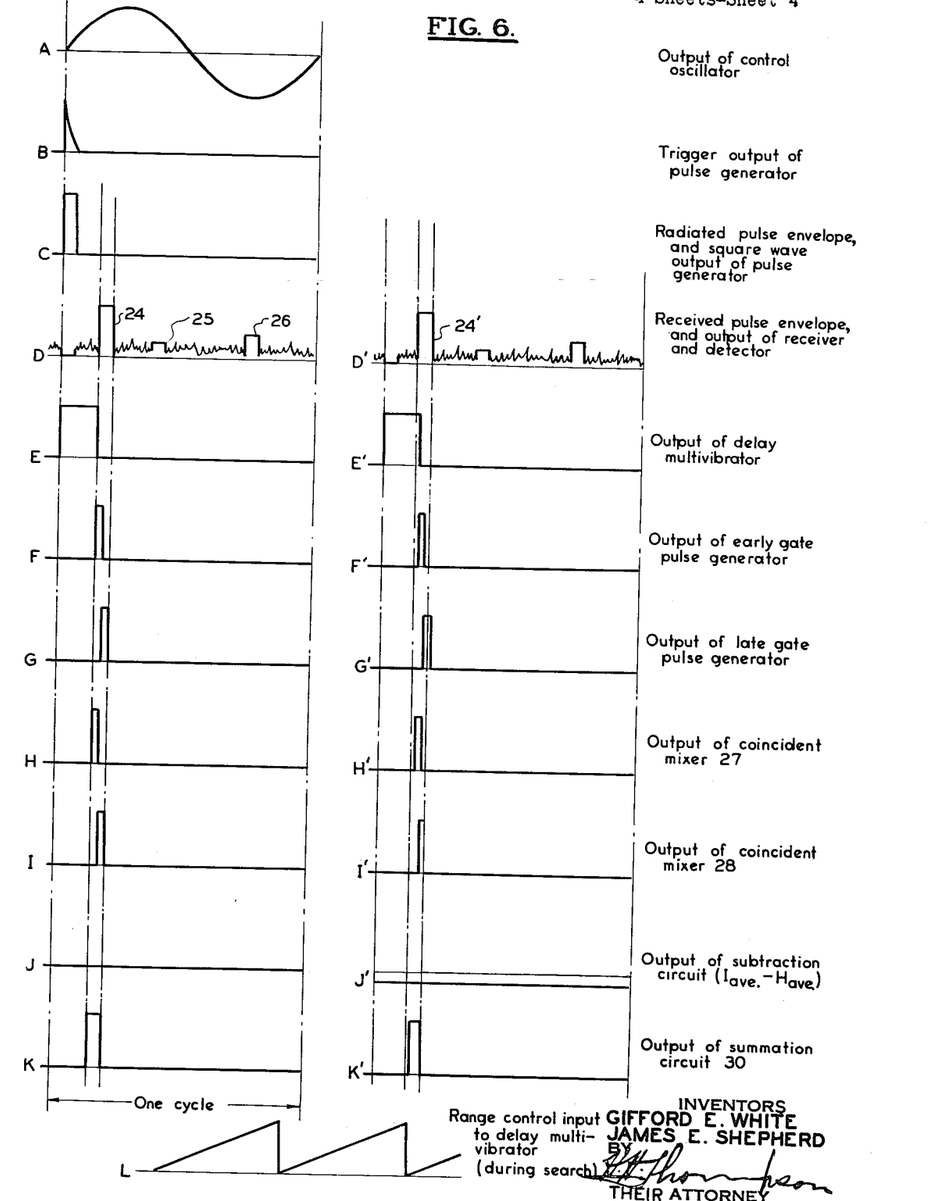
Fig. 6 shows various voltage-time curves useful in explaining the operation of the automatic range "gating" system of the invention.

Pulse generator 2 supplies trigger pulses, such as shown in Fig. 6, curve B, to a pulse transmitter 3, thereby causing an ultra high frequency oscillator included within the pulse transmitter 3 to be biased on momentarily. Transmitter 3 is thus caused to produce extremely short pulses of perhaps one micro-second duration of ultra high carrier frequency, the envelope of which may be of the form shown in Fig. 6, curve C. These pulses are then fed through wave guide 4 to a scanning radiator 5.

The scanning radiator 5 may be a simplified version of the type disclosed in copending application Serial No. 438,398 for Scanning Devices, filed April 10, 1942, in the names of Hall Langstroth and Fred C. Wallace now Patent No. 2,407,305 issued September 10, 1946. The radiator described in that application is adapted to first produce a spiral scanning motion for searching purposes and then produce a conical scanning motion for tracking purposes. The spiral scanning is accomplished by rotating the radiator about a spin axis and at the same time nodding the parabolic reflector at a slower rate about a nod axis perpendicular to the spin axis. Conical scanning is accomplished by simply stopping the nodding motion at a small angle from the zero nod position of the reflector, while continuing to rotate the radiator about the spin axis. Since in the present invention it is only required to produce conical scanning, which is utilized for both searching and tracking operations, the axis of the reflector may be permanently offset at an angle from the spin axis. In the present invention, therefore, no mechanism is required within the radiator 5 to produce a nodding motion.

The radiator 5 is shown in Fig. 1A in simplified form in order to clarify the basic mechanism. As there shown, a parabolic reflector 6 is mounted on a hollow supporting column 7, which column is in turn is supported upon a rotatable base (not shown). Reflector 6 and column 7 are adapted to be rotated about a spin axis 8 by the fixed motor 9 through gearing 10 and 11. Because of the bend in column 7, the axis 12 of the reflector 6 will then describe a cone about spin axis 8, thus providing the required conical scanning. It will be understood that the radiator 5 is so mounted in the fighter aircraft that the spin axis 8 is parallel to the longitudinal axis of the craft and its fixed guns.

The rotation of column 7 and reflector 6 about the spin axis 8 is transmitted as by gearing 13 and shaft 14 to a two-phase generator 15 which is adapted to produce on its output leads 16 and 17 two 90° phase-displaced alternating current voltages, which provide a time reference for the spin motion. In this way the instantaneous magnitude of the voltage appearing on lead 17 may be made to correspond at any time to the elevational component of the angle that the reflector axis 12 makes with the spin axis 8. Similarly, the instantaneous magnitude of the voltage appearing on lead 16 corresponds to the azimuthal component of that angle.

The ultra high frequency pulses originating in pulse transmitter 3 and propagated along the wave guide 4 enter the radiator 5 through the cylindrical wave guide 18. They are then transmitted to the deflecting plate 19 through the rotating joint 20 and a second cylindrical wave guide 21 mounted concentrically within the hollow column 7. The deflecting plate 19 is adapted to interchange energy with the reflector 6 so that a fan-shaped beam of electromagnetic energy is intermittently projected into space along the axis 12 of the reflector 6. In the present invention it is advantageous to have a fairly large angular displacement between the spin axis 8 and the reflector axis 12, and also to provide a fairly wide fan-shaped space radiation pattern of the electromagnetic energy for reasons which will later become apparent. Thus, as the reflector 6 spins about the axis 8, electromagnetic energy is radiated into a fairly large solid conical angle of space.

Radiator 5 serves also to receive energy reflected from remote objects during the intervals between successive transmission periods. The received energy passes in reverse direction through the wave guides associated with the radiator 5. A wave guide 4' connected to the cylindrical wave guide 18 conducts the received energy to a limiter 22 from which the energy is then led to a receiver and detector 23. The high frequency energy received by the receiver and detector 23 may have a wave shape whose envelope is shown in Fig. 6, curve D, wherein the pips 24, 25 and 26 represent targets at various distances from the aircraft, and the voltages intermediate to these pips represent noise.

The limiter 22 prevents the high-powered transmitted pulses from affecting the receiver 23, while allowing the relatively weak received energy to pass through with little attenuation. This limiter 22 may be of the gaseous discharge type known to the art, which consists of a gas-filled resonant chamber containing electrodes and maintained close to the ionization point. The limiter is adapted to discharge when strongly excited by the transmitted pulses and thus effectively damps the exciting oscillations. The electrical length of wave guide 4' is adjusted to reflect a very high impedance to the transmitted pulses at its junction with wave guide 4 when the transmitted pulses, upon attempting to pass through the limiter, discharge the resonant chamber and create substantially a short circuit therein.

The receiver and detector 23 detects and amplifies the received pulses in the usual manner, producing a voltage wave of the form shown in Fig. 6, curve D. This voltage wave is then transmitted to the coincident mixers 27 and 28, which form a portion of the range "gating" system later to be described in detail. To further insure that no transmitted pulses directly affect the receiver, suitable blanking pulses, such as are shown in Fig. 6, curve C, may be supplied to the receiver and detector 23 from the pulse generator 2 in order to bias the receiver to insensitivity for the duration of the transmitted pulses.

As more completely described in the aforesaid application Serial No. 441,188, now U. S. Patent 2,617,982, should an object or a target lie within a predetermined solid conical angle about the spin axis 8, a reflected pulse will be received back corresponding to each transmitted pulse. Also, these reflected pulses from a particular target will vary in amplitude at the spin frequency, the maximum amplitude occurring at the time that the reflector axis 12 more nearly coincides with the true line of sight to the target, and the amplitude of this spin frequency variation being proportional to the amount of angular deviation of the line of sight with respect to the spin axis 8. Thus, the detected pulses supplied to the coincident mixers 27 and 28 provide an inherent indication of the amount and direction of the angular deviation of the line of sight to the target with respect to the spin axis 8.

During search the function of the range "gating" system is to strip the voltage signal (Fig. 6, curve D) supplied to the coincident mixers 27 and 28 of noise voltage and also of all received pulses corresponding to targets at ranges other than that range at which the range "gating" system is instantaneously set. Thus, assuming that the setting of the range gate is proper to pass the pip 24 of the voltage wave shown in Fig. 6, curve D, the range gate functions to produce on lead 54, as an output of the summation circuit 30, a voltage wave of the form shown in Fig. 6, curve K consisting only of a single pulse which is coextensive in time with the pip 24.

Figures 2, 3, 4, 5:
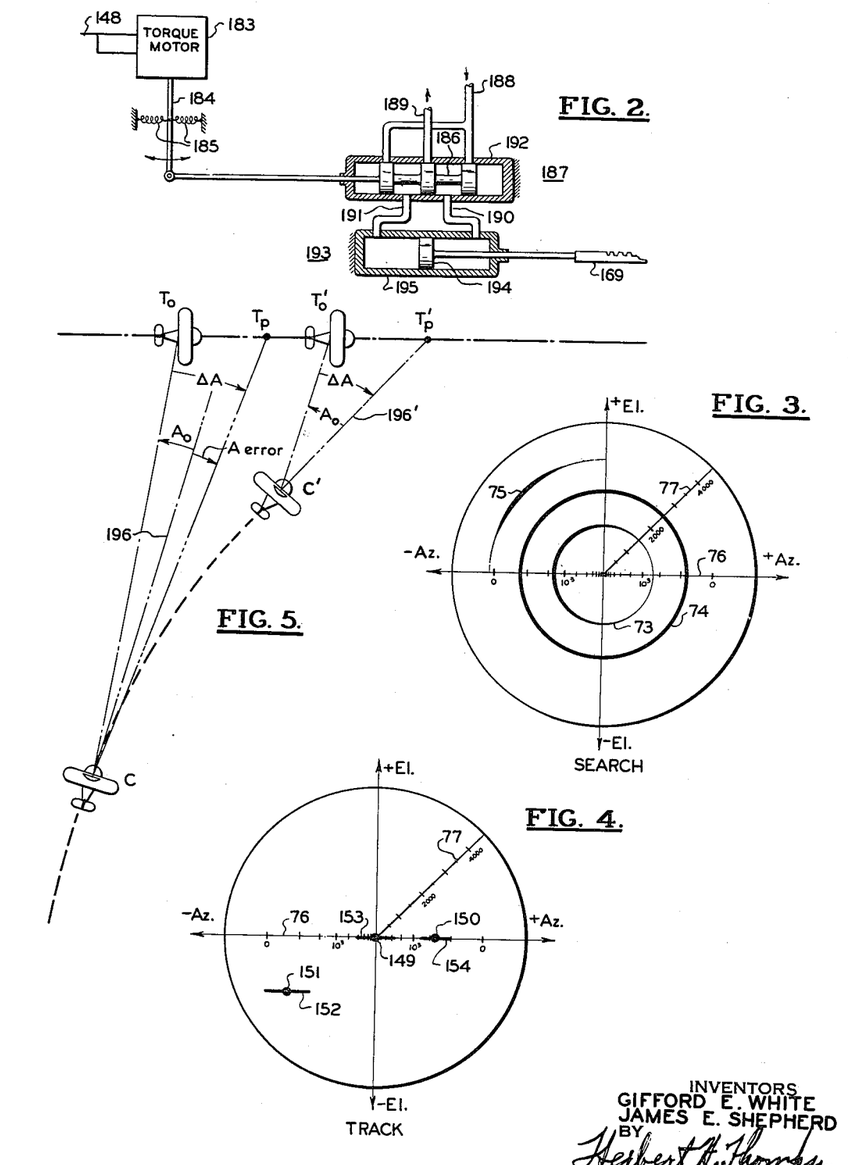
Fig. 2 is a schematic representation of one type of servo system suitable for use in the present invention.
Fig. 3 illustrates typical presentations appearing on the face of the cathode ray indicator tube of Fig. 1A during "search" mode of operation.
Fig. 4 illustrates typical presentations appearing on the face of the cathode ray indicator tube of Fig. 1A during "track" mode of operation.
Fig. 5 is a plan view typically illustrating the angular relationship in azimuth between the fighter aircraft and the target during the solution of the problem.

During the search (s) position of switch 32, it will be seen that the battery 33 will supply a constant direct voltage signal to the time of flight servo system 34, as on lead 35. The servo system 34 may be of any suitable type adapted to produce rotation of its output shaft 36 at an angular velocity corresponding in magnitude and direction to the magnitude and polarity of the input voltage signal. A servo system suitable for this purpose is shown in Fig. 2 and will later be described in detail. Thus, during search position of switch 32 the contact arm 37 of the range potentiometer 38 will be caused to rotate at a constant angular velocity through the action of shafts 36, gearing 39, and shaft 40.

For any one setting of the contact arm 41 of potentiometer 42, it will be seen that the potentiometer 38 will be supplied with a constant direct voltage from the battery 43. The range potentiometer 38 is wound so that when the angular displacement of shaft 40 is made proportional to time of flight, the voltage output on lead 44 is proportional to range. For purposes of the present discussion of operation during search, this relationship may be considered substantially linear. Therefore, a sawtooth voltage wave, such as is shown in Fig. 6, curve L, will be produced on lead 44 and will be fed to the delay multivibrator 46, as by lead 45. The frequency of repetition of the sawtooth wave appearing on leads 44 and 45 should be much lower than the spin frequency of reflector 6.

The delay multivibrator 46 is also supplied with a voltage trigger pulse, such as is shown in Fig. 6, curve B, from the pulse generator 2. The delay multivibrator is adapted to produce on its output lead 47 a voltage of the form shown in Fig. 6, curve E, which is initiated in time by the trigger pulse of Fig. 6, curve B, and has a duration proportional to the instantaneous magnitude of the sawtooth voltage received on lead 45. The delay multivibrator may be a modified version of the ordinary multivibrator, and may consist essentially of two cathode coupled triodes, the plate of the first triode being connected through a capacitor to the grid of the second. Upon applying the trigger pulse to the grid of the first triode through another condenser, and the sawtooth wave received on lead 45 to the plate of each triode and to the grid of the first through appropriate resistances, an output wave may be obtained, such as shown in Fig. 6, curve E, having a duration proportional to the instantaneous magnitude of the sawtooth wave and being initiated at the same time as the trigger pulse (Fig. 6, curve B) and the transmitted pulse (Fig. 6, curve C).

The output of the delay multivibrator is then fed to the early gate pulse generator 48, which is adapted to produce on its output leads 49 and 50 a voltage pulse such as shown in Fig. 6, curve F, which is initiated at the termination of the input pulse received from the delay multivibrator. Similarly, the late gate pulse generator 55 produces on lead 51 a voltage pulse such as is shown in Fig. 6, curve G, having a duration equal to the early gate pulse appearing on leads 49 and 50 and being initiated at the termination of the early gate pulse which is received on lead 50.

The early gate pulse appearing on lead 49 and the late gate pulse appearing on lead 51 are fed to the coincident mixers 27 and 28, respectively, along with the received voltage signal from the receiver and detector 23. The coincident mixer 27 is adapted to produce on its output lead 52 a voltage pulse corresponding to that portion of the received voltage signal which coincides in time with the early gate pulse received on lead 49. Thus, with the range "gating" system instantaneously set as shown, a voltage pulse of the form shown in Fig. 6, curve H will appear on output lead 52 and be conducted to the summation circuit 30. Similarly, the coincident mixer 28 produces on lead 53 a voltage pulse of the form shown in Fig. 6, curve I, which corresponds to that portion of the received voltage signal which is coexistent in time with the late gate pulse. This output pulse from the coincident mixer 28 is then also fed to the summation circuit 30.

The summation circuit 30 is adapted to produce on its output lead 54 a voltage pulse, such as shown in Fig. 6, curve K, corresponding to the sum of the two input pulses appearing on leads 52 and 53. Thus, it is seen that the range gating system acts as an electrical valve, passing only that portion of the received voltage signal (Fig. 6, curve D) which is coexistent in time with either the early or late pulse gates (Fig. 6, curves F and G). The setting of the valve, that is the phase of the gates with respect to the transmitted pulse, is controlled by the direct current input voltage to the delay multivibrator, appearing on lead 45. During search, as has been seen, the range gate setting is made to continuously vary in a uniform manner, whereas during track, as will later be described, the setting automatically adjusts itself so as to follow the reflected pulses from a particular target.

The output pulse from the summation circuit 30 is applied to the grid 61 of the cathode ray indicator tube 62, as by lead 29, thus placing the beam of the cathode ray tube under the control of the received pulses appearing on lead 54. Thus, the electron beam of the cathode ray tube 62 will only be turned on, during search, when a reflected pulse is received and when the setting of the range gating circuit, as determined by the instantaneous magnitude of the sawtooth voltage input to the delay multivibrator 46, is such as will allow the reflected pulse to pass. Also, the intensity of the electron beam will be proportional to the magnitude of the received pulse applied to the grid 61.

Since the instantaneous magnitude of the sawtooth wave fed to the delay multivibrator 46 determines the duration of the output pulse appearing on lead 47 and therefore the range setting of the gating system, the instantaneous magnitude of the sawtooth wave must be proportional to the range of the target, the reflected pulses from which are instantaneously being passed. This range control voltage is also fed to the modulators 63, 64 and 65, as by lead 66. The modulators 65 and 64 are adapted to modulate the amplitude of the elevation and azimuth reference voltages, respectively, which are received from the two phase generator 15, equally according to the range control voltage. In the search position of the 3 pole double throw switch 67, the amplitude modulated elevation and azimuth reference voltages produced by modulators 65 and 64, respectively, are applied to the vertical deflecting plates 68 and horizontal deflecting plates 69 of the cathode ray tube 62, as by leads 70 and 71, respectively.

As is well known, when two 90° phase displaced alternating current voltages are applied to the deflecting plates of a cathode ray tube, the electron beam is caused to trace out a circle, the radius of which is proportional to the amplitude of the voltages. Therefore, it will be seen that were the electron beam continuously on in the present case, it would be caused to trace out a spiral, since the amplitude of the applied voltages is linearly varying in accordance with the range control voltage. The instantaneous position of the dot caused by the electron beam would be removed from the center of the cathode ray tube face by an amount corresponding to the instantaneous range control voltage on lead 44, and therefore also corresponding to the setting of the range gating circuit. Moreover, the instantaneous orientation of the dot with respect to the center of the face of the cathode ray tube would correspond to the instantaneous angular orientation of the reflector axis 12 with respect to the spin axis 8.

Since the setting of the range gating circuit varies from zero to a maximum in accordance with the sawtooth range control voltage on lead 44, the radio sighting system will be caused to perform a "range" search for targets within the conical portion of space irradiated by the spinning reflector. In other words, the system will instantaneously be responsive to reflected pulses only from targets at a certain range, and the range at which the system is responsive will continuously vary from zero to a maximum.

Should a target be within the irradiated conical portion of space, pulses reflected from this target will be allowed to pass through the range gate circuit to the grid of the cathode ray tube 62 during the interval that the setting of the range gate circuit substantially corresponds to the range of that particular target. Since the frequency of the range search is slow compared to the spin frequency, the electron beam thus will ordinarily be caused to operate intermittently throughout at least one whole cycle of spin.

Typical presentations appearing on the face of the cathode ray tube during search are shown in Fig. 3, wherein the traces 73, 74 and 75, representing various targets, would appear successively in time. From the previous discussion it is obvious that the radius of a trace corresponds to the range of the target represented thereby, and also that the orientation of the most intense portion of the trace with respect to the center of the face corresponds to the orientation of the line of sight to the target with respect to the spin axis 8 of the radiator 5. Moreover, the variation in the intensity of the trace, corresponding to the amplitude of the spin frequency variations in intensity of the received pulses, provides an indication of the amount of angular deviation of the line of sight to the target with respect to the spin axis 8. Two range scales 76 and 77 are provided on the face of the cathode ray tube 62, the horizontal scale 76 being employed during track and the scale 77 being employed during search.

Thus, the trace 73 represents a target having a range of about 1,500 yards, a considerable azimuth angle in the minus, or left, direction, and zero elevation angle. The equi-intensity trace 74 represents a target dead ahead having a range of about 2,500 yards. A trace 75, forming an incomplete circle, would be caused by a target whose angular deviation with respect to the spin axis is so great that the target lies within the fan-shaped beam of irradiated energy only during a portion of the spin cycle. In such a case, the greater is the angular orientation of the target with respect to the spin axis, the smaller is the portion of the spin cycle during which the target is irradiated, and the smaller will be the corresponding trace. Therefore, for targets whose corresponding trace is an incomplete circle, the amount of angular deviation of the line of sight with respect to the spin axis 8 corresponds inversely to the length of the arc of the trace. Accordingly, trace 75 represents a target having an equal elevation and azimuth angle, the azimuth angle being in the minus direction, and the amount of deviation being greater than that of the target represented by trace 73, and having a range of about 3,500 yards.

In this way the pilot is provided, during search, with a visual indication of the presence of all targets within the conical portion of space irradiated by the spinning reflector, and with an indication of the range, and the direction and amount of angular deviation of the line of sight to each of said targets with respect to the spin axis 8 of radiator 5.

Whenever a target is encountered during the previously described range searching operation, the system is adapted to automatically switch to tracking operation, that is, the switches 32 and 67 are automatically switched to their track (*t*) position. As previously stated, as soon as a target is encountered, its reflected pulse is allowed to pass through the range gate system and to appear on lead 54. This pulse is fed to the detector 78, which is adapted to produce on lead 79 a direct voltage corresponding to the average value of this pulse. This direct voltage passes through the on-off switch 80 whenever this switch is in its normally closed position. The voltage appearing on lead 79, in such case, is allowed to energize the solenoids 81 and 82, which then pull the switches 67 and 32 to their track position against the tension of the springs 83 and 84, thereby transferring the operation of the system to track.

Should the pilot desire to retain searching operation in order that he might obtain an indication of all possible targets within the conical portion of space being scanned, he may maintain the switch 80 in its open position by continuously pressing the push button 85. Having then decided which target he desires to track in range, the pilot may release the push button just prior to the time at which an indication of that target would reappear on the face of the cathode ray indicator tube 62. When pulses are then received from that particular target, the relays 81 and 82 will be energized, the system will switch to tracking operation, and the particular target desired will be automatically tracked in range thereafter.

In order to accomplish this automatic range tracking, a detector 86 is provided, to which the outputs of both the coincident mixers 27 and 28 are fed, as by leads 87 and 88, respectively. The detector 86 is adapted to rectify the pulses received on leads 87 and 88, and to produce on leads 89 and 90, respectively, the rectified, or average, direct voltages corresponding thereto. These direct voltages are fed to the subtraction circuit 91, which produces on its output lead 92 a direct voltage of a magnitude and polarity corresponding to the algebraic difference between the two rectified input voltages, that is, corresponding to the average value of the pulse appearing on lead 53 minus the average value of the pulse appearing on lead 52. During the tracking position of switch 32, it is seen that this output voltage of the subtraction circuit 91 is employed as the control signal voltage for the time of flight servo system 34 and, therefore, controls the setting of the range gate system.

If it be assumed that the setting of the range gate system at any particular time, is an indicated in Fig. 6, curves E, F and G, and therefore, corresponds exactly to the range of the particular target represented by the pip 24, the outputs of coincident mixers 27 and 28 will be equal, as indicated in Fig. 6, curves H and I. In such a case, it is obvious that the output voltage of the subtraction circuit 91, appearing on lead 92, will be zero, as indicated in Fig. 6, curve J. Since this output voltage controls the velocity and direction of rotation of shaft 40 through the servo system 34 during tracking operation and, therefore, controls the setting of the range gate system, the setting will remain stationary. In such a case, the system is in equilibrium.

At an instant later, if it be assumed that the target being tracked in range is traveling toward the fighter aircraft, the pip 24′, representing the target, will now occur more quickly after the transmitted pulse, as indicated in Fig. 6, curve D'. In such a case, if it be assumed that the setting of the range gate system has not changed, the output of coincident mixer 27 will remain as before, as indicated in Fig. 6, curve H', whereas the output of coincident mixer 28 will be reduced, as indicated in Fig. 6, curve I', since the received pulse 24' no longer is completely coextensive in time with the late gate pulse (Fig. 6, curve G'). Thus, the rectified output voltage of detector 86, appearing on lead 90, will be less than the rectified output voltage appearing on lead 89. The direct voltage output of the subtraction circuit 91, appearing on lead 92, being the algebraic difference between these rectified voltages, will, therefore, have some negative value such as shown in Fig. 6, curve J'. Since this voltage, appearing on lead 92, is fed to the time of flight servo system, rotation of shaft 40 will be produced in such a direction as to cause the setting of the range gate system to realign itself with the pulse 24', thereby restoring the equilibrium condition represented by the unprimed voltage curves of Fig. 6. In this way, as the target represented by the pulse 34' moves in range with respect to the fighter aircraft, the setting of the range gate system is automatically and continuously varied so as to track the target in range.

Thus, during tracking operation, the voltage appearing on lead 44 and lead 66, being proportional to the setting of the range gate system necessary to track the target in range, must necessarily be proportional to range. Also, there is allowed to appear on lead 54 only the received pulses reflected from the target being tracked. These pulses are varying in amplitude sinusoidally at the spin frequency, the phase of the sinusoidal variation bearing a relation to the angular orientation of the line of sight to the target with respect to the spin axis, and the amplitude of this variation being proportional to the amount of angular orientation of the line of sight to the target with respect to the spin axis.

These received pulses, appearing on lead 54, are conducted to a detector and filter 133 (see Fig. 1B), as by lead 56, where the sinusoidal variation in amplitude is extracted and produced as an alternating current voltage on output lead 93. This voltage is then introduced into phase sensitive amplifiers 94 and 95. Also fed to the phase sensitive amplifiers 94 and 95 are the elevation and azimuth reference voltages appearing on leads 17 and 16, respectively.

The phase sensitive amplifier 94 is adapted to produce on its output lead 96 a direct voltage of a magnitude and polarity corresponding to that component of the voltage appearing on lead 93 which is in phase with the elevation reference voltage appearing on lead 17. Similarly, the phase sensitive amplifier 95 is adapted to produce on its output lead 97 a direct voltage of magnitude and polarity corresponding to that component of the voltage appearing on lead 93 which is in phase with the azimuth reference voltage appearing on lead 16. As more fully explained in previously mentioned copending application Serial No. 441,188, these output voltages appearing on leads 96 and 97 are proportional in amplitude and polarity to the magnitude and direction of the elevational and azimuthal components of the angle that the line of sight to the target makes with respect to the axis of the fighter aircraft. These voltages representing present azimuth ($A_0$) and present elevation ($E_0$) and appearing on leads 96 and 97 are fed to the summation circuits 98 and 99, respectively.

As is well known, in order to compute the future position of the target, it is necessary to obtain a signal corresponding to the time of flight ($t_0$). In the present invention the time of flight is considered to be a composite function of slant range ($D_0$), altitude (H) and indicated air speed (I. A. S.), according to the following formula, $$t_0 = f(D_0) \times f(H) \times f(I.\ A.\ S.)$$

The functions $f$ in all cases are determined empirically by well-known methods from government supplied ballistic tables. The functions differ with each type of projectile because of the variation of the different types in dynamic and geometric particulars.

In Fig. 1A there is shown apparatus for introducing the logarithms of the required functions of altitude (H) and indicated air speed (I. A. S.). A fixed scale 100 is provided marked off in appropriate altitude steps. Cooperating with fixed scale 100 is a movable index 101 shown as inscribed on a movable index ring 102. Ring 102 is provided with gear teeth at its periphery and may be rotated by altitude control knob 103 through pinion 104. Thus, by suitably graduating the fixed scale 100 the logarithm of the desired function of altitude can be introduced as a rotation of ring 102 by matching the fixed index 101 with the graduation on fixed scale 100 which corresponds to the actual altitude (H).

Inside ring 102 is a dial 105, bearing indicated air speed indications graduated in accordance with the logarithm of the desired function of indicated air speed (I. A. S.). Dial 105 is rotated from indicated air speed knob 106 through gearing 107 and shaft 108. Thus, by rotating indicated air speed knob 106 until the actual indicated air speed may be read on dial 105 opposite the movable index (previously rotated in accordance with the logarithm of a function of altitude) shafts 109 and 110 will, of necessity, be rotated an amount corresponding to the logarithm of the desired function of the actual altitude (H) plus the logarithm of the desired function of the indicated air speed (I. A. S.).

The rotation of shaft 110 is transmitted as by gearing 111 and shaft 112 to the movable contact arm 41 of potentiometer 42 which is fed from the constant direction voltage source 43. Potentiometer 42 is so wound that when its movable contact 41 is rotated an amount proportional to the logarithm of a quantity, a voltage is produced on output lead 113 proportional to the quantity itself. Thus, the voltage appearing on lead 113 may be considered as representing the desired function of altitude times the desired function of air speed ($f(H) \times f(I.\ A.\ S.)$).

The voltage appearing on output lead 113 is applied to the ungrounded end of the winding of range potentiometer 38. Potentiometer 38 is so wound that when it is energized as described, and when its movable contact arm 37 is rotated an amount proportional to time of flight ($t_0$), a voltage is produced on its output lead 44 proportional to slant range ($D_0$). As previously described, due to the action of the automatic range tracking system, the time of flight servo system 34 will continue to rotate movable contact 37 until a voltage is produced on output lead 44 which is proportional to slant range ($D_0$). Therefore, the angular rotation of shaft 114 is necessarily proportional to the time of flight ($t_0$).

Referring again to Fig. 1B, time of flight shaft 114 is seen to actuate movable contact arms 115, 116, and 117 of potentiometers 118, 119 and 120. Potentiometer 118 is energized from a constant source of direct voltage 122 and is so wound as to produce on its output lead 123 a direct voltage proportional to the predetermined function of the time of flight ($t_0$) necessary to obtain the superelevation correction angle ($\phi_s$). The output voltage 123 representing $\phi_s$ is then fed to the summation circuit 124.

The potentiometers 119 and 120 are energized respectively, from the direct voltages appearing on leads 125 and 126, which, as will more fully be explained hereinafter, are proportional to the elevation rate ($E_r$) and azimuth rate ($A_r$), respectively. The potentiometers 119 and 120, being linearly wound, are adapted to produce on their output leads 127 and 128, respectively, voltages proportional to $E_r \times t_0$ and $A_r \times t_0$, respectively.

Summation circuit 124 is adapted to produce on its output lead 130 the algebraic sum of the two input voltages appearing on leads 123 and 127. Accordingly, the output voltage appearing on lead 130 is proportional to the sum of the superelevation angle ($\phi_s$) and the prediction lead angle ($E_r \times t_0$) and is, therefore, proportional to the total elevation lead angle ($\Delta E$). This voltage is then fed to the summation circuit 98. Similarly, the voltage appearing on lead 128, being proportional to the azimuth prediction angle ($A_r \times t_0$), and therefore also proportional to the azimuth lead angle ($\Delta A$) is fed to the summation circuit 99.

For fixed gun aircraft, since the azimuth and elevation angles of the gun ($A_g$) and ($E_g$) with respect to the craft must always be zero, the fire control problem is solved, that is, the aircraft and the guns are correctly oriented to effect a hit when the present elevation ($E_0$) and azimuth ($A_0$) angles of the line of sight to the target are respectively equal and opposite to the lead angles ($\Delta E$, $\Delta A$). Accordingly, the summation circuit 98 is adapted to produce on its output lead 131 the algebraic sum of its two input voltages received on leads 96 and 130. Similarly, summation circuit 99 is adapted to produce on its output lead 132 the algebraic sum of its two input voltages received on leads 97 and 128. The voltage appearing on output lead 131 is therefore proportional to present elevation plus elevation lead angle ($E_0 + \Delta E$), and the voltage appearing on output lead 131 is proportional to present azimuth plus azimuth lead angle ($A_0 + \Delta A$). Since the guns are only correctly oriented when these output voltages are zero, these output voltages (if any exist) may be considered as error voltage signals, and as representing the elevational and azimuthal components ($E_{error}$ and $A_{error}$), respectively, of the deviation between the actual orientation of the craft and the orientation of the craft necessary for effective gun fire.

In order to obtain the elevation and azimuth rates ($E_r$, $A_r$), which appear as proportional voltages on leads 125 and 126, respectively, an elevation rate gyro 136 and an azimuth rate gyro 137 are respectively employed. These gyros may be of the spring restrained angular rate, or two degrees of freedom type, such as those described in copending application Serial No. 440,660, for Lead Computing Devices, filed April 27, 1942, in the names of C. S. Draper and E. P. Bentley, and now U. S. Patent No. 2,609,606 issued September 9, 1952.

In said Patent No. 2,609,606, two such gyros mounted on a gun are precessed by the angular velocity of the gun in elevation and azimuth, respectively, against a damping torque, an acceleration torque and a spring or elastic torque. As more fully explained in said Patent No. 2,609,606, by properly designing the system, the acceleration torque may be made substantially zero, and the damping torque may be made just sufficient to cause stable operation and eliminate the false prediction which would otherwise result when the angular gun rate is not constant. The angle of precession is then proportional to the rate of turn, and the proportionality constant is adjusted to be equal to the time of flight, so that the total angle of precession is proportional to prediction.

In the present invention we prefer to employ such a device only to obtain elevation and azimuth rates which may then be multiplied by time of flight in the auxiliary apparatus previously described. Therefore, in our case, the proportionality factor between the total angle of precession and the rate of turn is maintained constant.

Accordingly, the azimuth rate gyro 137, having two degrees of freedom, one about the spin axis of the gyroscope rotor and the other about a precession axis of the trunnions carrying the rotor, is mounted on the aircraft so that each of these axes of freedom is maintained at right angles to the azimuth axis, that is, the normally vertical axis through the craft. As the spin axis of the gyroscope is caused to rotate about the azimuth axis due to turning of the craft (and the gun) in azimuth, the gyro will be caused to precess about its precessional axis by an amount proportional to the angular velocity of rotation of the craft about the azimuth axis. The output shaft 138 from the azimuth rate gyro 137 is connected to the gyro so as to be rotated by the precession of the gyro. Therefore, the angular displacement of shaft 138 may be considered as representing the aircraft azimuth rate ($A_r$) and and may be employed in our prediction apparatus.

Shaft 138 actuates movable contact arm 139 of the linearly wound potentiometer 140, the opposite ends of the winding of which are connected to a constant source of direct voltage 141. In this way the voltage appearing on output lead 126 is proportional in magnitude and polarity to the amount and direction of the azimuth rate ($A_r$).

In a similar way, the elevation rate gyro 136 is mounted on the aircraft so as to have its two axes of freedom perpendicular to the elevational axis, that is, the normally horizontal lateral axis through the aircraft. The angular displacement of output shaft 142, corresponding to the angle of precession of the gyro, is proportional to the angular rate of turning of the craft (and the guns) about the elevation axis. Shaft 142 actuates the movable contact arm 143 of potentiometer 144 which is energized from the constant source of direct voltage 145. The output voltage appearing on lead 125 is thus proportional in magnitude and polarity to the amount and direction of the elevation rate ($E_r$).

The error voltage signals appearing on leads 131 and 132, representing the elevation and azimuthal components of the angular deviation between the present orientation of the craft and the orientation necessary to effect a hit, are transmitted by leads 147 and 148 to the cathode ray indicator tube 62 (see Fig. 1A) when switch 67 is in its track ($t$) position, and are there applied to the vertical deflecting plates 68 and horizontal deflecting plates 69, respectively. The electron beam of the cathode ray indicator tube is thereby deflected from its central position vertically and horizontally by an amount and in a direction corresponding to the elevation error angle ($E_{error}$) and the azimuth error angle ($A_{error}$).

Typical presentations appearing on the face of the cathode ray indicator tube 62 during tracking operations are illustrated in Fig. 4, wherein the dots 149, 150 and 151 represent particular targets which may be being tracked at different times. The horizontal and vertical displacements of a dot representing a target, such as dot 151, indicate the angular deviation in azimuth and elevation, respectively, between the actual orientation of the craft and the orientation required to effect a hit on that particular target. In operation the pilot may fly his craft in such a manner as to bring the dot to the center of the face of the cathode ray tube, at which time the elevation and azimuth error angles are zero, indicating that the problem has been solved and that the craft is at the correct orientation to effect a hit.

In order to provide the pilot with an approximate indication of the range of the target which is being tracked, suitable range wings 152, 153 and 154 are provided, the length of which is inversely proportional to the range. A horizontal range scale 76 is provided for use during tracking operations from which the range of targets, whose corresponding dot appears at the center of the indicator face, such as dot 149, may be read off directly. For other targets the range scale 76 may be used as a yardstick to approximate the range.

As shown in Fig. 1A, the above referred to range wings are provided by superimposing upon the horizontal deflecting plates 69 of the cathode ray indicator tube 62, an alternating voltage of an amplitude inversely proportional to the range. In order to accomplish this, the direct voltage corresponding to slant range ($D_0$), appearing on lead 66, is fed to the modulator 63 to which also is fed, as on lead 155, an alternating voltage from a suitable source. The modulator 63 is adapted to produce on its output lead 156, the required alternating voltage of an amplitude inversely proportional to the range. Modulator 63 may, for example, comprise merely an ordinary pentode, the control grid of which is supplied with the slant range voltage received on lead 66, and the screen grid of which is supplied with the alternating voltage received on lead 155. The required output voltage on lead 156 may then be obtained from the plate of the pentode.

Referring again to Fig. 1B, there is shown an electrical gun firing circuit, which may control one or more guns, in which the constant source of direct voltage 157 is adapted to energize a firing solenoid 158 when the firing key 159 and the elevation cut-out switch 160 and the azimuth cut-out switch 161 are all closed. The elevation and azimuth cut-out switches 160 and 161 are normally maintained closed by the tension of springs 162 and 163. However, these cut-out switches 160 and 161 may be respectively opened against the action of the springs by current flow through the control solenoids 164 and 165 which may be energized from the elevation error signal voltage, appearing on lead 147, and the azimuth error signal, appearing on lead 148, respectively.

Thus, it is seen that whenever the aircraft is not correctly oriented both in elevation and azimuth to effect a hit, one or the other of the cut-out switches 160 and 161 will be maintained open by its corresponding control solenoid. Accordingly, the closing of the firing key 159 by the pilot can be effective to fire the gun only when both error signal voltages are zero, that is, when firing will effect a hit. In this way, the pilot is allowed to close his firing key 159 as soon as the target being tracked is within range. He may maintain his firing key closed while bringing the spot representing the target to the center of the face of the cathode ray tube 62 and be assured that firing will automatically take place as soon as, and only when, the error signal voltages are zero.

There is also provided means in the present invention for transferring from manual operation, in which the pilot himself controls his craft so as to bring the spot to the center of the indicator, to automatic operation, in which an automatic pilot system automatically orients the plane correctly for effective gun fire in response to the elevation and azimuth error signal voltages. The pilot may initiate automatic operation by closing the three-pole single-throw switch 166 thereby transmitting the azimuth error signal voltage, appearing on lead 148, to the rudder servo system 167, and the elevation error signal voltage, appearing on lead 147, to the elevator servo system 168.

The rudder and elevator servo systems 167 and 168 may be of the type shown in Fig. 2 later to be described in detail, or they may be of any other suitable type adapted to produce a displacement of their respective output rack members 169 and 170 at a velocity proportional to their respective input error signal voltages. Displacement of output rack member 169 is transmitted through the pinion 171 to the rudder control pulley system 172 thereby producing a corresponding movement of the rudder control surface. The repositioning of the aircraft in azimuth resulting from the movement of the rudder control surface is in such a direction as to decrease the azimuth error signal voltage appearing on lead 148. It will be obvious that displacement of the rudder control surface will continue to take place until such time as the azimuth error signal voltage becomes zero.

Similarly, displacement of the output rack member 170 of the elevator servo system 168 is transmitted to the elevator control surfaces of the aircraft through the pinion 173 and the elevator control pulley system 174. The resulting movement of the elevator control surface will continue until a condition of equilibrium has been established at which the elevation error signal voltage appearing on lead 147 will have become substantially zero. Thus, in automatic operation, the orientation of the plane is placed under the control of the rudder servo system 167 and the elevator servo system 168 in such a manner as to correctly orient the plane for effective gun fire.

In order to maintain the proper angle of bank for the aircraft corresponding to the turning of the aircraft in azimuth caused by automatic operation of the rudder control surface, a pendulum alternating current pick-off device 175 is provided which senses the error in the angle of bank and produces on its output lead 177, an alternating voltage corresponding in amplitude and phase to the magnitude and sense of the existing banking angle error. This alternating voltage is fed to a balanced rectifier 178 which transforms the alternating voltage signal into a direct voltage signal corresponding in magnitude and polarity to the magnitude and sense of the banking angle error.

This banking angle error direct voltage signal, appearing on lead 176, is then fed through switch 166 to the aileron servo system 179 where it is employed as the input control signal voltage. The output rack member 180 of servo system 179, acting through pinion 181 and the control pulley system 182, displaces the aileron control surfaces in such a direction as to reduce the banking error angle signal voltage to zero. When the signal voltage is thus reduced to zero, the correct banking angle has been established.

A suitable type of pendulum alternating current pick-off device for sensing the direction and magnitude of the banking angle error is disclosed in copending application Serial No. 462,440 for A Fixed Gun Inter-Aircraft Fire Control System, filed October 17, 1942 in the names of E. B. Hammond, Jr. and G. E. White, now Patent No. 2,433,843 issued January 6, 1948 although any similar device could be here employed. As described in that application, an E-type, or three leg, transformer core is fixedly mounted on the craft, the winding on the middle leg of which is energized from a suitable source of alternating current. The windings on the opposing outer legs of the core are connected oppositely and in series, the resulting voltage appearing across their unconnected ends providing the desired alternating signal voltage output. A rotatable armature is mounted concentrically within the faces of the three legs so that a strip of magnetic material mounted thereon forms a part of the magnetic circuit of the device. A pendulous element is fixedly attached to the armature with the result that the armature is positioned in accordance with the deviation from the horizontal of the resultant of the gravitational force and the acceleration force due to turning of the craft in azimuth. The fixedly mounted core however, is positioned in accordance with the existing angle of bank of the aircraft. When these two angles are equal, the strip of magnetic material is concentrically positioned with respect to the two outer legs of the core. The voltages induced in the outer windings are therefore equal and opposite, and the output signal voltage is zero, indicating that the existing angle of bank is correct. If the existing banking angle should not be such as to establish a symmetrical position of the strip of magnetic material, one or the other of the two outer windings will have a greater voltage induced therein, and the output signal voltage will thus correspond in amplitude and phase to the amount and direction of the banking angle error.

In Fig. 2, there is shown one type of servo system suitable for use as the rudder, elevator and aileron servo systems 167, 168 and 179 and also the time of flight servo system 34. The rudder servo system 167 is particularly illustrated in Fig. 2. As has been previously pointed out, the input signal voltage appearing on lead 148 is a reversible polarity direct voltage. This voltage controls a suitable torque motor 183 of any conventional type adapted to produce an angular displacement of its output member 184 in a direction and of an amount corresponding to the polarity and magnitude of the input control voltage.

As shown, output member 184 may be centralized by suitable springs 185 which also assure a linear and proportionate type of control. Output member 184 is adapted to reciprocate the control piston 186 of a suitable control valve 187 which is supplied with hydraulic or pneumatic pressure from a suitable pump as by a duct 188 and is connected to a return reservoir or sump by a duct 189.

Valve 187 is adapted to produce between its output ducts 190 and 191 a differential fluid pressure corresponding in sense and magnitude to the relative displacement between its piston 186 and housing 192. This differential pressure is led to a servo motor 193 having a movable piston 194 and a fixed housing 195. The differential pressure causes piston 194 to move, thereby causing output rack 169 to be displaced at a velocity proportional to the displacement of control piston 186 and therefore also proportional to the control voltage apearing on lead 148.

It will be understood, however, that the invention is not limited to the type of servo system above described. More refined systems employing well-known anti-hunt and anti-lag features could obviously be employed without departing from the principles of the invention.

Referring now to Fig. 5, there is shown typical angular and spatial relationships existing between the fighter aircraft and the target in azimuth during two phases of the solution of the problem. The first phase, which is indicated on the left of Fig. 5, may represent the time at which tracking operations on a particular target are first begun. The fighter aircraft is indicated at point C, the present position of the target at point $T_0$, and the computed future position of the target at point $T_p$. The axis of the fighter craft is indicated by the line 196. As there shown the lead angle ($\Delta A$) in this particular case, is greater than the present azimuth angle ($A_0$) and in an opposite direction. The azimuth error angle ($A_{error}$), being the algebraic sum of the lead angle ($\Delta A$) and the present azimuth angle ($A_0$), will in this case have a value equal to the arithmetical difference between these two angles and be in the same direction as the lead angle ($\Delta A$).

As the orientation of the aircraft is changed in the direction such as to reduce the azimuth error angle ($A_{error}$) to zero, either in automatic or manual operation, the present azimuth angle ($A_0$) will be increased until it becomes equal and opposite to the lead angle ($\Delta A$) at which time the azimuth error angle ($A_{error}$) will be zero.

This final phase, in which the solution of the problem has just been accomplished, is indicated on the right-hand side of Fig. 5 wherein the primed letters and numbers correspond to the unprimed letters and numbers indicated in the earlier phase represented on the left-hand side of Fig. 5. As there shown, when the present azimuth angle ($A_0$) and the lead angle ($\Delta A$) are equal and opposite, the azimuth error angle being then equal to zero, the fighter aircraft is correctly oriented in azimuth to effect a hit on the target at its future position ($T'_p$).

The operation of the system in elevation so as to reduce the elevation error angle ($\Delta E$) to zero takes place in exactly the same manner as illustrated in Fig. 5 for azimuth. In this manner, the aircraft may be quickly and accurately aligned so that its normally horizontal fore and aft axes and the line of fire are oriented directly toward the future position of the target ($T'_p$), as computed by the computing apparatus previously described. When this condition exists the aircraft is correctly oriented to effect a hit upon the target.

Various elements of the present invention, such as the early and late gate pulse generators 48, 55, the coincident mixers 27, 28, summation circuits 30, 98, 99, 124, subtraction circuit 91 and others, have been indicated schematically in the drawings and described in terms of their functions in the written material. Since the function of these elements may be accomplished in various well-known ways, particularly through various combinations of electronic devices, and since their details form no part of the present invention, it has not been thought necessary to describe them in more detail.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a target searching system for fire control apparatus, means for producing periodic pulses of electromagnetic energy, directive radiating means for projecting said pulses into space along the axis of said radiating means, means for rotating said radiating means about another slightly offset axis, whereby a predetermined conical portion of space is swept with said energy pulses, means for receiving the corresponding pulses reflected from a target, a normally blocked electrical channel for transmitting said received pulses, pulse gate means for generating gate pulses having a duration substantially equal to that of said radiated pulses for unblocking said channel, control means for continuously varying the phase of said gate pulses with respect to said radiated pulses, whereby said searching system is made sensitive to continuously varying ranges, means for generating voltages variable in synchronism with the orientation of the radiating means about its axis of rotation, and means activated jointly by said reflected pulses and said generated voltages, whereby said searching system is made sensitive to the orientation of the target about said axis of rotation.

2. In a target searching system for fire control apparatus, means for producing periodic pulses of electromagnetic energy, directive radiating means for projecting said pulses into space along the axis of said radiating means, means for rotating said radiating means about another slightly offset axis, whereby a predetermined conical portion of space is swept with said energy pulses, means for receiving the corresponding pulses reflected from a target, a normally blocked electrical channel for transmitting said received pulses, pulse gate means for generating gate pulses having a duration substantially equal to that of said radiated pulses for unblocking said channel, control means for continuously varying the phase of said gate pulses with respect to said radiated pulses, a cathode ray tube, means for circularly scanning the cathode ray beam thereof in synchronism with the rotation of said radiating means, means for controlling the radius of the circle scanned by said beam in correspondence with the phase shift between said radiated pulses and said gate pulses, and means responsive to the passage of said received pulses through said channel for causing said beam to operate, whereby an indication of the range and orientation of each of said targets lying within said portion of space is provided on the face of said indicator tube.

3. Apparatus, as claimed in claim 2, further including means also responsive to the passage of said received pulses through said channel for rendering ineffective said control means and for maintaining the pulses from said pulse gate means in cophasal relationship with the received pulses from a particular target.

4. Apparatus, as claimed in claim 2, further including control transfer means also responsive to the passage of said received pulses through said channel for rendering ineffective said control means and for maintaining the pulses from said pulse gate means in cophasal relationship with the received pulses from a particular target, and means for rendering ineffective said control transfer means.

5. In fire control apparatus, a radio sighting system adapted to two successive modes of operation, range searching and range tracking, comprising, means for producing periodic pulses of electromagnetic energy, directive radiating means for projecting said energy pulses into space along the axis of said radiating means, means for rotating said radiating means about another slightly offset axis, whereby a predetermined conical portion of space is swept with said energy pulses, means for receiving the corresponding pulses reflected from a target, blocking means having a pulse gate circuit for producing gate pulses for blocking said received pulses except for the duration of said gate pulses, means for continuously varying the phase of said gate pulses with respect to said radiated pulses during search, and means for automatically maintaining the phase of said gate pulses in correspondence with that of the received pulses from a particular target during track.

6. Apparatus, as claimed in claim 5, further including, means for automatically initiating said tracking mode in response to the receipt of unblocked received pulses.

7. Apparatus, as claimed in claim 5, further including, means for automatically initiating said tracking mode in response to the receipt of unblocked received pulses, and means for rendering ineffective said last-named means.

References Cited in the file of this patent

UNITED STATES PATENTS

| Number | Name | Date |
|---|---|---|
| 1,532,794 | Akemann | Apr. 7, 1925 |
| 1,880,671 | Bates | Oct. 4, 1932 |
| 1,919,191 | Bates | July 25, 1933 |
| 1,924,174 | Wolf | Aug. 29, 1933 |
| 2,065,303 | Chafee et al. | Dec. 22, 1936 |
| 2,082,347 | Leib et al. | June 1, 1937 |
| 2,083,242 | Runge | June 8, 1937 |
| 2,176,469 | Moueix | Oct. 17, 1939 |
| 2,189,549 | Hershberger | Feb. 6, 1940 |
| 2,231,929 | Lyman | Feb. 18, 1941 |
| 2,235,826 | Chafee | Mar. 25, 1941 |
| 2,304,566 | Haberlin | Dec. 8, 1942 |
| 2,412,612 | Godet | Dec. 17, 1946 |
| 2,416,562 | Alexanderson | Feb. 25, 1947 |
| 2,433,843 | Hammond et al. | Jan. 6, 1948 |

FOREIGN PATENTS

| Number | Country | Date |
|---|---|---|
| 164,765 | Great Britain | June 23, 1921 |
| 227,489 | Great Britain | Jan. 9, 1925 |
| 764,537 | France | Mar. 5, 1934 |
| 542,634 | Great Britain | Mar. 21, 1942 |